United States Patent
Pai et al.

(10) Patent No.: US 9,817,679 B1
(45) Date of Patent: Nov. 14, 2017

(54) TECHNIQUE FOR COLLECTING FINANCIAL INFORMATION

(75) Inventors: Yogish Pai, Santa Clara, CA (US); Thirugnanam Subbiah, Irving, CA (US); Sunil Bannur Vittal, Bangalore (IN); Richard M. Ng, Needham, MA (US); Raghunath N. Battula, Sunnyvale, CA (US); John P. Motz, Walnut Creek, CA (US)

(73) Assignee: INTUIT INC., Mountain View, CA (US)

( * ) Notice: Subject to any disclaimer, the term of this patent is extended or adjusted under 35 U.S.C. 154(b) by 1328 days.

(21) Appl. No.: 12/538,708

(22) Filed: Aug. 10, 2009

(51) Int. Cl.
*G06Q 40/00* (2012.01)
*G06F 9/44* (2006.01)

(52) U.S. Cl.
CPC .................. *G06F 9/4443* (2013.01)

(58) Field of Classification Search
USPC ............................. 705/1, 500, 35, 36 R, 37
See application file for complete search history.

(56) References Cited

U.S. PATENT DOCUMENTS

| | | | |
|---|---|---|---|
| 2003/0023880 A1* | 1/2003 | Edwards | H04L 63/0815 726/1 |
| 2008/0293019 A1* | 11/2008 | Dooley et al. | 434/107 |
| 2010/0138316 A1* | 6/2010 | Connors | G06F 9/4443 705/26.1 |

* cited by examiner

*Primary Examiner* — Olabode Akintola (57) ABSTRACT

A technique for collecting financial information is described. During this technique, a customer request to a financial institution to access a financial-software application is used to initiate an exchange of financial information between the financial institution and a provider of the financial-software application. In particular, in response to the forwarded customer request, the provider of the financial-software application may request, and then receive, financial information associated with the customer's account from the financial institution. Subsequently, the provider of the financial-software application may provide a document that facilitates access to the financial-software application to the customer. This document may include at least some of the received financial information. Note that in all of the communication between the provider of the financial-software application and the financial institution, credential information for the customer, such as a password associated with the account, may be excluded.

17 Claims, 4 Drawing Sheets

TECHNIQUE FOR COLLECTING FINANCIAL INFORMATION

BACKGROUND

The present invention relates to techniques for collecting financial information for one or more individuals.

Existing financial-software applications, such as accounting applications, financial-planning applications, and income-tax-preparation applications, typically operate by collecting financial information associated with one or more customer or user accounts. For example, a customer may have one or more: bank accounts, credit card accounts, and/or investment accounts (such as brokerage accounts). After collecting this financial information, a financial-software application may use the financial information for various operations, such as determining profit and loss, producing financial forecasts, and/or preparing income-tax returns.

Unfortunately, existing financial-software applications typically require users to provide details for each account during an initialization or setup operation. Thus, for each account a user may need to provide account information, such as: an account number, an account type, a provider name, a provider address, a provider telephone number, a routing or access code, user identification, and/or credential information (e.g., a password). Assembling and providing all of this account information is a time-consuming, error-prone process. Furthermore, many users are reluctant to provide credential information because of the possibility of misuse.

SUMMARY

One embodiment of this invention provides a computer system that collects financial information. During operation, the computer system receives an application request for a financial-software application from a first computer system associated with a financial institution. Note that this application request includes customer information other than credential information for a customer of the financial institution. In response to the application request, the computer system requests financial information associated with the customer from the first computer system, where the financial-information request also includes information other than credential information for the customer. Then, the computer system receives the requested financial information from the first computer system. Next, the computer system provides a document that facilitates access to the financial-software application to the first computer system.

In some embodiments, prior to providing the document, the computer system includes at least a portion of the received financial information in the document.

Note that the document may include a web page. Alternatively or additionally, the document may include an application that is configured to execute on the first computer system and/or on a second computer system associated with the customer.

Furthermore, the credential information may include a password associated with a financial account of the customer that is maintained by the financial institution. Therefore, the financial information may be associated with the financial account of the customer.

Additionally, the application request may include identifier information for the customer, such as: a token, a customer name, a user name associated with a customer account at the financial institution, a customer location, and/or contact information for the customer. The computer system may identify an existing customer account based at least on the identifier information. Alternatively, the computer system may establish a customer account if, based on the identifier information, the customer currently does not have one.

In some embodiments, the computer system updates a customer account based at least on the received financial information.

In some embodiments, the application request is expressed using a security assertion markup language (SAML) and/or the financial-information request is expressed using an open-financial-exchange (OFX) format.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a technique for collecting financial information, and a computer-program product (e.g., software) for use with the computer system are described. In this technique, a customer request to a financial institution to access a financial-software application is used to initiate an exchange of financial information between the financial institution and a provider of the financial-software application. In particular, in response to the forwarded customer request, the provider of the financial-software application may request, and then receive, financial information associated with the customer's account from the financial institution. Subsequently, the provider of the financial-software application may provide a document that facilitates access to the financial-software application to the customer. This document may include at least some of the received financial information. Note that in all of the communication between the provider of the financial-software application and the financial institution, credential information for the customer, such as a password associated with the account, may be excluded.

This technique for collecting financial information may allow the provider of the financial-software application to update customer financial information without requiring that the customer provide the credential information (or even any account information). Because many customers are reluctant to provide credential information, the technique for collecting financial information may simplify the overall process. Furthermore, the collected financial information can be used to perform calculations and/or populate fields in the financial-software application, thereby reducing customer effort when using the financial-software application. Therefore, the technique for collecting financial information may increase customer satisfaction with the financial-software application, with a commensurate impact on customer retention and sales.

Figure 1:
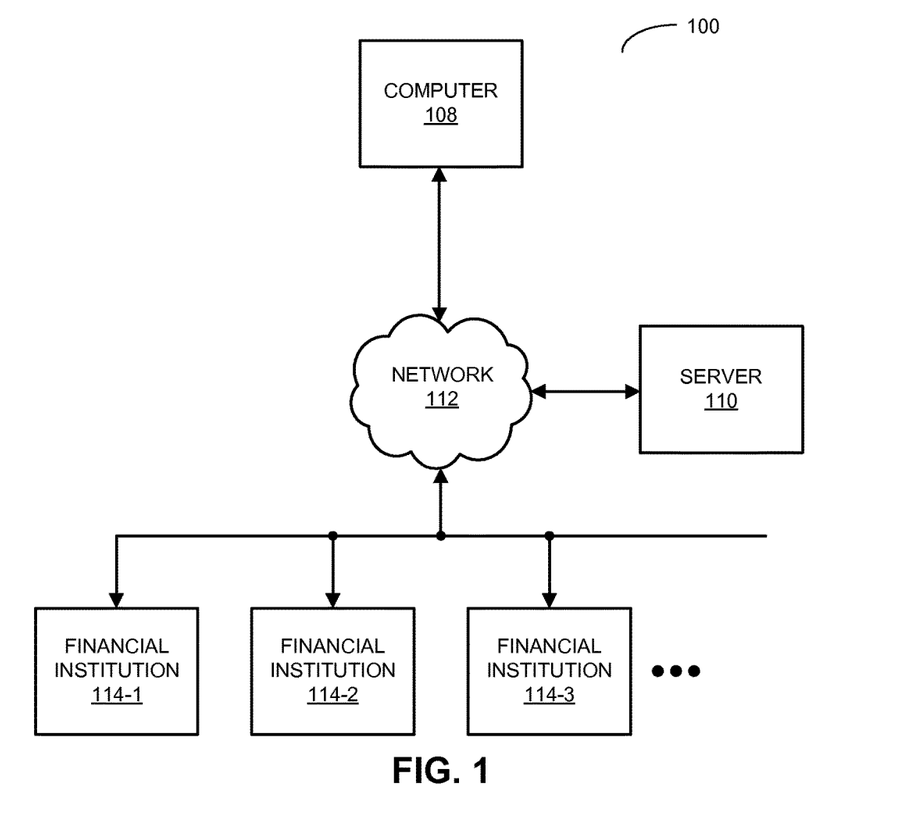
FIG. 1 is a block diagram illustrating a computer system that collects financial information in accordance with an embodiment of the present invention.

We now describe embodiments of the computer system. More specifically, FIG. 1 presents a block diagram illustrating a computer system 100 that collects financial information. In this system, server 110 may collect financial information for one or more customers or users of financial software. In particular, when a user of computer 108 accesses a web page or website of one of financial institutions 114 (such as a bank, a brokerage, a credit-card provider, etc.) via network 112 (for example, using a web browser that is installed and executes on computer 108), the user may select or click on an icon that requests access to a financial-software application provided by an entity that maintains and operates server 110 (which is sometimes referred to as an 'application request'). This application request may initiate an exchange of financial information associated with a user financial account between the financial institution (such as financial institution 114-1) and server 110.

Note that the user financial account may be maintained by financial institution 114-1. Furthermore, the financial-information exchange may be based on a pre-existing business relationship between financial institution 114-1 and the provider of the financial software. As a consequence, the financial-information exchange may occur without the user providing credential information (such as a password) and/or financial-account information for the financial account to the provider, either when the request for access to the financial-software application occurred and/or when the user set up an account with the provider (if the user has previously used the financial-software application).

In some embodiments, in response to the user's request for access to the financial-software application, a computer system associated with financial institution 114-1 may forward the application request to server 110 via network 112. This forwarded application request may be expressed using a security assertion markup language (SAML). (However, a variety of formats may be used.) Because the user did not provide the credential information when the application request occurred, the forwarded application request may not include the credential information. However, the forwarded application request may include customer or user information, such as: a token, a customer name, a user name associated with a financial account at the financial institution, a customer location, and/or contact information for the customer. Note that the user information is sometimes referred to as 'identifier information.'

In response to the application request, server 110 may request, via network 112, the financial information associated with the user financial account from the computer system associated with financial institution 114-1. This financial-information request may be expressed using an open-financial-exchange (OFX) format. (However, a variety of formats may be used.) Moreover, once again, the financial-information request may not include the credential information. However, the financial-information request may include financial information, such as an account balance and/or information associated with one or more financial transactions (e.g., a payment amount, a transaction day/time, a transaction location, payee information, information about an item purchased or a service, etc.).

Then, the computer system associated with financial institution 114-1 may provide the requested financial information to server 110 via network 112. Server 110 may establish or update a user account based at least on the received financial information. For example, using the identifier information in the forwarded application request, server 110 may identify an existing user account. Alternatively, server 110 may establish a user account if, based on the identifier information, the user currently does not have one.

Next, server 110 may provide, via network 112, a document that facilitates access to the financial-software application to the computer system associated with financial institution 114-1. In some embodiments, prior to providing the document, server 110 may include at least a portion of the received user financial information in the document. For example, at least a portion of the received user financial information may be used to perform calculations and/or to populate one or more fields in the financial-software application.

Note that the document may include a web page that the computer system associated with financial institution 114-1 forwards to computer 108 via network 112. Alternatively or additionally, the document may include an application that is configured to execute on the computer system associated with financial institution 114-1 and/or on computer system 108.

For example, the application may be a stand-alone application or a portion of another application that is resident on and which executes on the computer system associated with financial institution 114-1 and/or on computer system 108. Alternatively and/or additionally, at least a portion of the application may be a financial-software application tool that is embedded in a web page (and which executes in a virtual environment of a web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application (such as on computer 108). Thus, the financial-software application may be provided to the user via a client-server architecture.

Note that the user financial information may be stored at one or more locations in computer system 100 (i.e., locally or remotely). Moreover, because this information may be sensitive in nature, it may be encrypted. For example, stored information and/or information communicated via network 112 may be encrypted.

Figure 2:
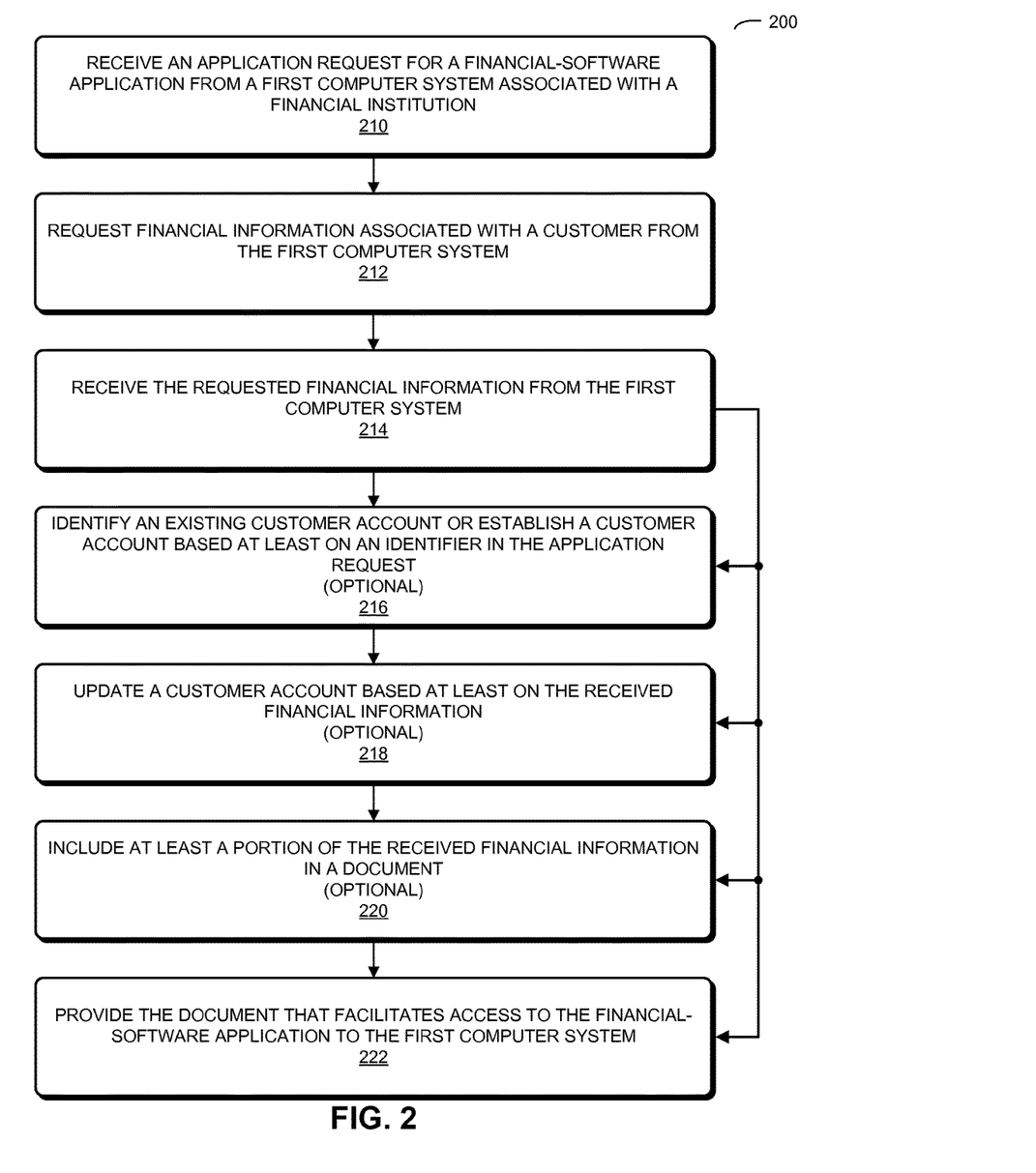
FIG. 2 is a flow chart illustrating a method for collecting financial information in accordance with an embodiment of the present invention.

We now describe the method for collecting financial information. FIG. 2 presents a flow chart illustrating a method 200 for collecting financial information, which may be performed by a computer system (such as computer system 100 in FIG. 1). During operation, the computer system receives an application request for a financial-software application from a first computer system associated with a financial institution (operation 210). Note that this application request includes customer information other than credential information for a customer of the financial institution. In response to the application request, the computer system requests financial information associated with the customer from the first computer system (operation 212), where the financial-information request also includes information other than credential information for the customer. Then, the computer system receives the requested financial information from the first computer system (operation 214). Next, the computer system provides a document that facilitates access to the financial-software application to the first computer system (operation 222).

In some embodiments, the computer system optionally identifies an existing customer account or optionally establishes a customer account based at least on the identifier information (operation 216). Then, the computer system may optionally update a customer account based at least on the received financial information (operation 218).

Furthermore, in some embodiments, prior to providing the document (operation 222), the computer system optionally includes at least a portion of the received financial information in the document (operation 220).

In some embodiments of process 200, there may be additional or fewer operations. Moreover, the order of the operations may be changed and/or two or more operations may be combined into a single operation.

While the preceding embodiments illustrate the exchange of financial information between a financial institution and a provider of financial software without exchanging credential information for a customer or user, in some embodiments credential information is exchanged during the first time such a handshaking process occurs between the financial institution and the provider of financial software in order to authenticate the exchange of the financial information. Furthermore, in some embodiments, if another user associated with the user's financial account (such as the user's spouse) makes the application request (for example, as determined by the financial institution), then server 110 (FIG. 1) may request the user's credential information prior to making the financial-information request. Similarly, if the user makes an application request on a web page or website of an organization that does not have a pre-existing business relationship with the provider of the financial software, or if the application request is forwarded by a third party to one of financial institutions 114 (FIG. 1), then server 110 (FIG. 1) may request the user's credential information prior to making the financial-information request.

Figure 3:
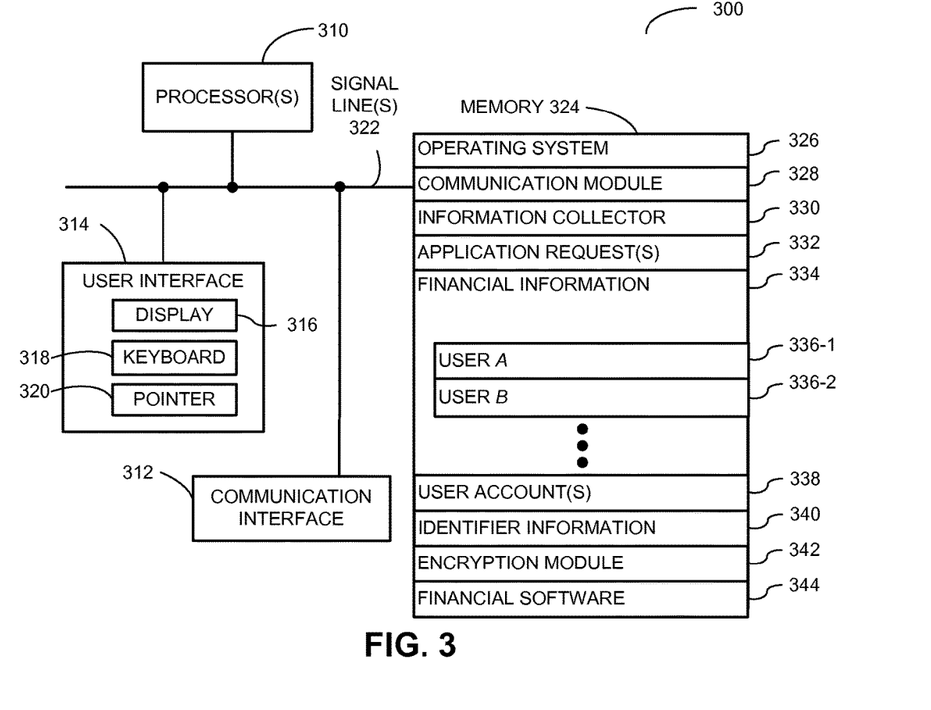
FIG. 3 is a block diagram illustrating a computer system in accordance with an embodiment of the present invention.

We now further describe embodiments of the computer system. FIG. 3 presents a block diagram illustrating a computer system 300, such as server 110 (FIG. 1), which collects financial information. Computer system 300 includes one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to the computer system 300.

Memory 324 may also include multiple program modules (or sets of instructions), including: information collector 330 (or a set of instructions), encryption module 342 (or a set of instructions) and/or financial software 344 (or a set of instructions). Note that one or more of these program modules (or sets of instructions) may constitute a computer-program mechanism.

In response to an application request, such as one of requests 332, from a user (which may be received from a financial institution), information collector 330 may request user financial information from the financial institution. As noted previously, the application request and the financial-information request may not include credential information for a user financial account maintained by the financial institution.

Financial information received from the financial institution may be stored in financial information 334. This financial information may be associated with one or more user accounts 338, such as financial information for user A 336-1 and financial information for user B 336-1. These accounts may have been previously established by the associated users or may be established in response to one or more of requests 332. Thus, when financial information 334 is received, the associated user account(s) 338 may be updated. For example, an existing account for a user may be identified, or a new account may be established, based on identifier information 340 that is included in the one or more requests 332.

In addition, financial software 344 may be provided to the one or more users in response to the one or more requests 332. For example, a web page (or, more generally, a document) and/or an application that facilitates access to financial software 344 may be provided to a user. This application may be installed and may execute on a computer system associated with the financial institution or on a computer associated with the user.

In some embodiments, at least some of the received financial information 334 is included in the web page and/or the application before it is provided to the user. For example, at least some of the received financial information 334 may be used to perform one or more calculations and/or fill in one or more fields in financial software 344.

In some embodiments, at least some of the information stored in memory 324 and/or at least some of the information communicated using communication module 328 is encrypted using encryption module 342.

Instructions in the various modules in the memory 324 may be implemented in: a high-level procedural language, an object-oriented programming language, and/or in an assembly or machine language. Note that the programming language may be compiled or interpreted, e.g., configurable or configured, to be executed by the one or more processing units 310.

Although the computer system 300 is illustrated as having a number of discrete items, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computers and servers in computer systems 100 (FIG. 1) and/or 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, LAN, WAN, MAN, or a combination of networks, or other technology enabling communication between computing systems.

In exemplary embodiments, the financial-software application includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application (i.e., financial software 344) may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Computer systems 100 (FIG. 1) and/or 300 may include fewer components or additional components. Moreover, two or more components may be combined into a single component, and/or a position of one or more components may be changed. In some embodiments, the functionality of the computer system 300 may be implemented more in hardware and less in software, or less in hardware and more in software, as is known in the art.

Figure 4:
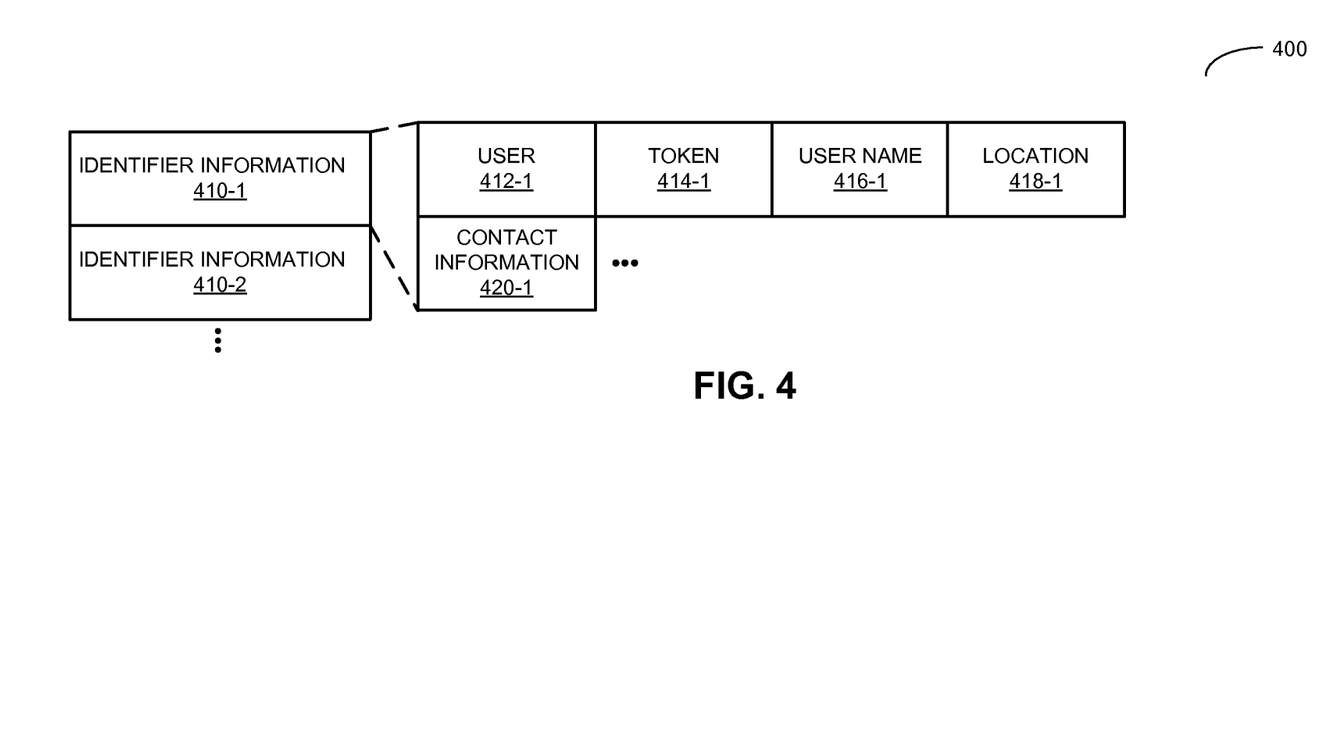
FIG. 4 is a block diagram illustrating a data structure for use in the computer system of FIG. 3 in accordance with an embodiment of the present invention.

We now discuss a data structure that may be used in computer systems 100 (FIG. 1) and/or 300. FIG. 4 presents a block diagram illustrating a data structure 400 for use in computer systems 100 (FIG. 1) and/or 300. This data structure may include identifier information 410. For example, identifier information 410-1 for a user may include: a user's name 412-1, a token 414-1, a user name 416-1 associated with a user financial account (which may be maintained by a financial institution) or a user account with the provider of the financial software, a location 418-1 (such as the user's address) and/or contact information 420-1 for the user (such as a phone number or an email address).

In some embodiments of data structure 400 there may be fewer or additional components. Moreover, two or more components may be combined into a single component and/or a position of one or more components may be changed.

While the preceding embodiments have used financial information and a financial-software application as illustrations, in other embodiments the technique may be used to collect a wide variety of information (other than financial information) for use with many different types of software applications (other than the financial software).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for enabling automatic collection of financial information associated with a customer at a financial institution by a financial software application, comprising:
receiving, at a transmission server for a provider of the financial-software application, an application request from the financial institution,
wherein the transmission server comprises a microprocessor and a memory,
wherein the application request is in response to a request received initially at a data server of the financial institution from a customer computer, the received request in the form of a physical click at an icon associated with the financial software application at a webpage of the financial institution,
wherein the application request includes a token comprising customer information,
wherein the application request does not include password information associated with an account of the customer at the financial institution,
wherein for all communications between the financial institution and the transmission server password information for the account of the customer at the financial institution is excluded, and
wherein the transmission server does not receive password information for the account of the customer at the financial institution from the customer computer;
in response to receiving the application request, sending, by the transmission server of the provider of the financial-software application, a request for financial information associated with the account of the customer at the financial institution, wherein the account of the customer at the financial institution including the financial information is password protected,
wherein the sent request comprises customer information,
wherein the request for financial information does not include password information associated with the account of the customer at the financial institution, and
wherein the transmission server does not have access to password information associated with the account of the customer at the financial institution;
receiving, at the transmission server of the provider of the financial-software application, the requested financial information from the data server of the financial institution, wherein the data server accesses the password protected financial information based on the customer information;
subsequent to receiving the requested financial information:
accessing the memory of the transmission server of the provider of the financial software application, the memory containing financial information associated with the customer; and
transmitting, over a data channel, from the transmission server of the provider of the financial software application to the financial institution, a financial document for display at an information-viewing application on the customer computer, wherein the financial document is generated from the financial information of the customer.

2. The method of claim 1, wherein prior to providing the financial document, the method further comprises including at least a portion of the requested financial information in the document.

3. The method of claim 1, wherein the financial document includes a web page.

4. The method of claim 1, wherein the financial document includes an application that is configured to execute on the data server of the financial institution.

5. The method of claim 1, wherein the financial document includes an application that is configured to execute on the customer computer.

6. The method of claim 1, the method further comprising updating a customer account based at least on the received financial information.

7. The method of claim 1, wherein the application request is expressed using the security assertion markup language (SAML).

8. The method of claim 1, wherein the request for financial information is expressed using an open-financial-exchange (OFX) format.

9. The method of claim 1, wherein the request for financial information includes financial information for the user, wherein the financial information for the user comprises at least one of:
an account balance, and
information for one or more past financial transaction, and
wherein the information for the one or more past financial transactions comprises at least one of:
a payment amount,
a transaction day/time,
a transaction location,
payee information,
information about an item purchased, and
information about a service purchased.

10. A computer-program product for use in conjunction with a computer system, the computer-program product comprising a non-transitory computer-readable storage medium and a computer-program mechanism embedded therein for configuring the computer system, the computer-program mechanism for enabling automatic collection of financial information associated with a customer at a financial institution by a financial software application, the mechanism including:
instructions for receiving, at a transmission server for a provider of the financial-software application, an application request from the financial institution,
wherein the transmission server comprises a microprocessor and a memory,
wherein the application request is in response to a request received initially at a data server of the financial institution from a customer computer, the received request in the form of a physical click at an icon associated with the financial software application at a webpage of the financial institution,
wherein the application request includes a token comprising customer information,
wherein the application request does not include password information associated with an account of the customer at the financial institution,
wherein for all communications between the financial institution and the transmission server password information for the account of the customer at the financial institution is excluded, and
wherein the transmission server does not receive password information for the account of the customer at the financial institution from the customer computer;
instructions for in response to receiving the application request, sending by the transmission server of the provider of the financial-software application, in response to receiving the application request, a request for financial information associated with the account of the customer at the financial institution, wherein the account of the customer at the financial institution including the financial information is password protected,
wherein the sent request comprises customer information,
wherein the request for financial information does not include password information associated with the account of the customer at the financial institution, and
wherein the transmission server does not have access to password information associated with the account of the customer at the financial institution;
instructions for receiving, at the transmission server of the provider of the financial-software application, the requested financial information from the data server of the financial institution, wherein the data server accesses the password protected financial information based on the customer information;
instructions for, subsequent to receiving the financial information:
accessing the memory of the transmission server of the provider of the financial software application, the memory containing financial information associated with the customer; and
transmitting, over a data channel, from the transmission server of the provider of the financial software application to the financial institution, subsequent to receiving the requested financial information, a financial document for display at an information-viewing application on the customer computer.

11. The computer program product of claim 10, wherein prior to providing the financial document, the method further comprises at least a portion of the requested financial information in the document.

12. The computer program product of claim 10, the method further comprising updating a customer account based at least on the received financial information.

13. The computer program product of claim 10, wherein the request for financial information includes financial information for the user, wherein the financial information for the user comprises at least one of:
- an account balance, and
- information for one or more past financial transaction, and wherein the information for the one or more past financial transactions comprises at least one of:
- a payment amount,
- a transaction day/time,
- a transaction location,
- payee information,
- information about an item purchased, and
- information about a service purchased.

14. A computer system, comprising:
- a processor;
- memory; and
- a program module, wherein the program module for enabling automatic collection of financial information associated with a customer at a financial institution by a financial software application is stored in the memory and configurable to be executed by the processor, the program module including:
  - instructions for receiving, at a transmission server for a provider of the financial-software application, an application request from the financial institution,
    - wherein the transmission server comprises a microprocessor and a memory,
    - wherein the application request is in response to a request received initially at a data server of the financial institution from a customer computer, the received request in the form of a physical click at an icon associated with the financial software application at a webpage of the financial institution,
    - wherein the application request includes a token comprising customer information,
    - wherein the application request does not include password information associated with an account of the customer at the financial institution,
    - wherein for all communications between the financial institution and the transmission server password information for the account of the customer at the financial institution is excluded, and
    - wherein the transmission server does not receive password information for the account of the customer at the financial institution from the customer computer;
  - instructions for in response to receiving the application request, sending by the transmission server of the provider of the financial-software application, in response to receiving the application request, a request for financial information associated with the account of the customer at the financial institution,
    - wherein the account of the customer at the financial institution including the financial information is password protected,
    - wherein the sent request comprises customer information,
    - wherein the request for financial information does not include password information associated with the account of the customer at the financial institution, and
    - wherein the transmission server does not have access to password information associated with the account of the customer at the financial institution;
  - instructions for receiving, at the transmission server of the provider of the financial-software application, the requested financial information from the data server of the financial institution, wherein the data server accesses the password protected financial information based on the customer information;
  - instructions for, subsequent to receiving the financial information:
    - accessing the memory of the transmission server of the provider of the financial software application, the memory containing financial information associated with the customer; and
    - transmitting, over a data channel, from the transmission server of the provider of the financial software application to the financial institution, subsequent to receiving the requested financial information, a financial document for display at an information-viewing application on the customer computer.

15. The system of claim 14, wherein prior to providing the financial document, the method further comprises at least a portion of the requested financial information in the document.

16. The system of claim 14, the method further comprising updating a customer account based at least on the received financial information.

17. The system of claim 14, wherein the request for financial information includes financial information for the user, wherein the financial information for the user comprises at least one of:
- an account balance, and
- information for one or more past financial transaction, and wherein the information for the one or more past financial transactions comprises at least one of:
- a payment amount,
- a transaction day/time,
- a transaction location,
- payee information,
- information about an item purchased, and
- information about a service purchased.

* * * * *